Dec. 16, 1952　　　　　G. C. COSDEN　　　　　2,621,362
APPARATUS FOR STUNNING POULTRY
Filed Oct. 2, 1950

INVENTOR.
GILBERT C. COSDEN
BY *Kalish & Gross*
ATTORNEYS

Patented Dec. 16, 1952

2,621,362

UNITED STATES PATENT OFFICE 2,621,362

APPARATUS FOR STUNNING POULTRY

Gilbert C. Cosden, Milford, Del., assignor to Sussex Poultry Company, Inc., Milford, Del., a corporation of Delaware Application October 2, 1950, Serial No. 187,998

11 Claims. (Cl. 17—11)

This invention relates in general to certain new and useful improvements in apparatus for stunning poultry.

It is the primary object of the present invention to provide apparatus for stunning poultry which is adapted to subject continuously conveyed live fowls to successive electric charges for a predetermined period without stoppage of the processing line in order to stun same for preventing struggling and writhing of the fowls during consequent bleeding operation.

It is another object of the present invention to provide a device of the character stated which incorporates means for controlling the amount of current imparted to the fowls with relation to the speed with which the fowls are being conveyed, so that each fowl will receive requisite current for stunning.

It is a further object of the present invention to provide a device of the character stated which provides a plurality of aligned electrode members adapted for successive contact by fowls continuously conveyed therethrough, each of said electrode members having associated therewith a controllable circuit so that they may be regulated independently of each other in order that the resultant charge to the fowls will have desired intensity.

It is an additional object of the present invention to provide a device of the character stated which is constructed so as to prevent operators from receiving inadvertent electric shocks; which is economically made; and is reliable and durable in usage.

With the above and other objects in view, my invention resides in the novel features of form, construction, arrangement, and combination of parts presently described and pointed out in the claims.

In the accompanying drawing—

Figure 1:
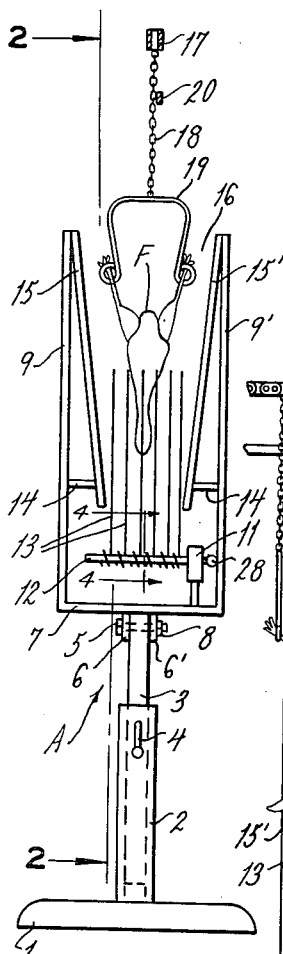
Figure 3:
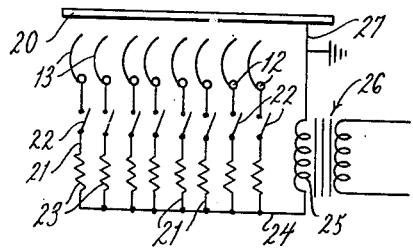
Figure 2:
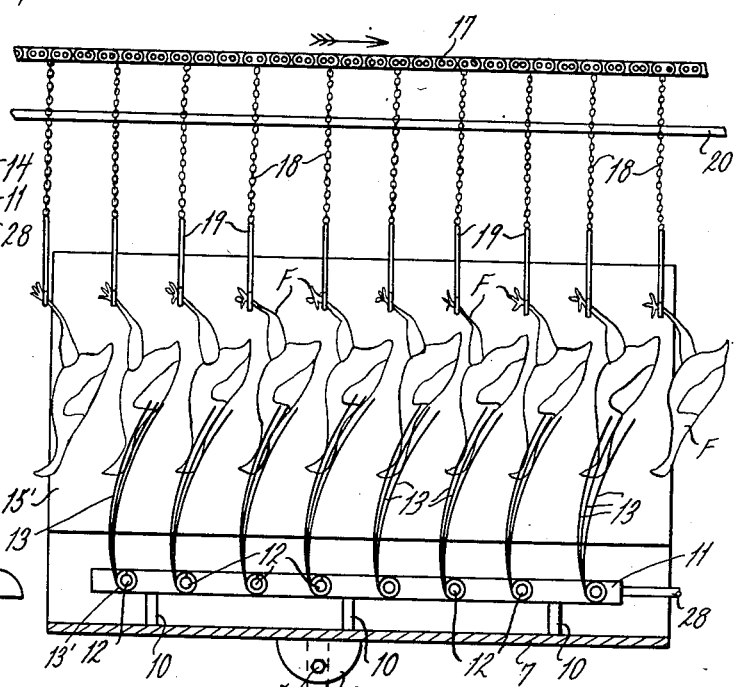
Figure 4:
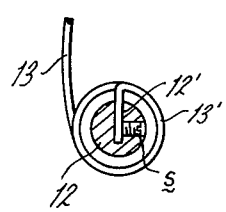

Figure 1 is an end view of apparatus for stunning poultry constructed in accordance with and embodying the present invention; and Figure 2 is an enlarged transverse sectional view taken along line 2—2 of Figure 1; and Figure 3 is a diagram of the electric circuit employed; and Figure 4 is an enlarged fragmentary transverse sectional view taken along line 4—4 of Fig. 1 and showing the means for securement of the electrode members.

Referring now by reference characters to the drawing which illustrates a preferred embodiment of the present invention, A designates an apparatus or a device for stunning poultry comprising a base 1 integrally provided with an upwardly projecting column 2 axially bored to receive an arm 3 for vertical adjustment therein and being maintained in relative selected position by means of a set screw 4. Adjacent its upper end the arm 3 is transversely drilled for receiving a hinge pin 5 which projects at its ends through suitable apertures in spaced ears 6, 6', depending from the under surface of an elongated plate 7, the pin-receiving apertures of said ears 6, 6', being aligned substantially with the transverse axis of the plate 7. Engaged upon the hinge pin 5 is a lock nut 8 for securing the plate 7 in any selected degree of angularity with relation to the vertical axis of the arm 3. Upstanding from the opposite longitudinal margins of the plate 7, and extending from end to end thereof, are relatively enlarged rectangular guard plates 9, 9'. Secured at intervals to the upper face of the plate 7, adjacent the guard plate 9', is a plurality of short arm members 10, for supporting a longitudinally extending insulator bar 11 fabricated of suitable dielectric material. Rigidly fixed at one of their ends in the bar 11 are transversely disposed conductor bars, preferably eight in number, uniformly spaced and having their axes normal to that of the bar 11. Said conductor bars 12 are free at their opposite ends, which terminate a short distance from the guard plate 9 to avoid untoward conductive engagement therewith. Mounted in and upon each of the conductor bars 12 for upward presentation therefrom is a brush-like group of resilient electrode-forming members 13, fabricated desirably of spring wire, being free at their upper ends, which are in downwardly spaced relation to the plane of the top margins of the guard plates 9, 9'. The lower ends of electrode members 13 are inserted in suitable recesses 12' provided in the conductor bars 12, and are retained rigidly therein by set screws s, with the immediately adjacent portions being coiled, as at 13', about the bars 12 to provide added bending resiliency.

Projecting inwardly from, and attached to, the inner faces of each of the guard plates 9, 9', is a series of brace members 14 for supporting at their inner ends downwardly converging insulated guide plates 15, 15', which generally define a passageway 16 therebetween. Said guide plates 15, 15', are conveniently affixed at their upper ends to the upper marginal portions of the guard plates 9, 9', respectively, with their lower ends being disposed adjacent the respective end electrode member 13 of each group.

Provided for co-operation with the device A is a conveyor or chain 17 of conventional design being preferably of the ceiling type and adapted for continuous travel at variable speeds in a path aligned with the longitudinal axis of the plate 7 in elevated relation to the device A. Secured to and depending from the conveyor 17 at intervals is a plurality of support chains 18 each having a shackle member 19 engaged on its lower end, to which may be secured the feet of a fowl F, causing same to be disposed in head-down position. Said chains 18 are of sufficient length so that the suspended fowls F upon conveyance through the passageway 16 will make positive contact with the electrode members 13 in the areas of their head, neck, breast, and wing portions, as may best be seen in Figure 1. Suitably disposed beneath the conveyor 17 is a longitudinally extending grounding bar 20 represented for contactive engagement with the support chains 18 for purposes to be now described.

Referring to the circuit diagram presented in Figure 3, it will be seen that each of the conductor bars 12 is connected to a control circuit designated 21 having a switch 22 and a current-limiting member or resistor 23. The individual control circuits 21 are connected in parallel by a main lead 24 to the secondary 25 of a transformer 26, the primary of which is connected to a source of electric supply (not shown). On its opposite pole the secondary 25 is in circuit with the grounding bar 20 through a grounded lead 27. Thus, upon energization of the transformer 26, current will flow through the individual circuits 21 into the associated conductor bars 12, and thence to the electrode members 13 engaged thereon. By contact of the fowls F against the electrode members 13, the circuit will be completed, as the current will pass through the fowls F and thus to ground by means of the chains 18, the grounding bar 20, and the lead 27. It has been found that under working conditions, the desired applied transformer secondary voltage may be about 600 and the normal amperage in each control circuit may be approximately 100 milliamperes. The various leads from the conductor bars 12 are suitably encased in an insulated conduit 28 secured to the bar 11.

In operation, the conveyor 17 is actuated to move live fowls F through the passageway 16 at the particular rate of speed desired and the transformer 26 is energized to effect flow of current through the control circuits 21. The conveyor chain 17 will cause the fowls F to engage successively each group of electrode members 13, whereupon the fowls F will receive a shock as the current flows therethrough to the grounding bar 20 in circuit-closing manner. Each of the poultry thus processed receives a series of shocks as the processing line progresses. Any tendency for lateral movement of the fowls F will be limited by the guide plates 15, 15', which assure that each fowl F will come into engagement with each group of electrode members 13. It will be seen that there is no stoppage whatever of the production line as the fowls F are moving continuously at all times, and having completed the travel through the device A are in a totally stunned state, and completely quiescent, with consequent muscular relaxation, so that the severing of the jugular vein to effect bleeding may be accomplished expeditiously and humanely. The electrode members 13, being resilient, will remain in contact with the moving fowls F an adequate period to insure the imparting of a sufficient shock thereto, the coiled portions 13' being subjected to tension and tightening somewhat about the conductor bars 12.

In normal operation the current value, say 100 milliamperes, is kept constant. The duration of the contact of the poultry with the electric current is then the crucial factor. It has been found that 3.5 to 4 seconds of contact is requisite for stunning the fowls F in order to eliminate violent convulsize action during the succeeding operation. It is to be emphasized that the fowls are merely stunned, not electrocuted. As one beneficial result of the application of such stunning current, prior to the so-called "sticking" operation, the stimulated heart action will materially assist in the drainage of the blood.

Therefore, the number of electrodes energized will be a function of the speed of conveyance of the fowls F. As an example, it has been found that with the fowls F being conveyed through the passageway 16 at the rate of 7000 per hour, all of the eight groups of electrode members 13 will be charged, with the current being constant, as stated above. In the event the fowls F are being conducted at a greatly reduced rate, such as 3500 per hour, only half of the groups of electrode members 13 will be charged, with the current being of the same constant value. In this condition the switches 22 in alternate of the control circuits 21 will be in the off position and, hence, contact by the fowls F with the "dead" electrodes 13 will not in any way affect the operation.

It will thus be seen that the device A is adapted for high speed production, providing proper stunning of the poultry without intermittent stoppage as is required in currently used poultry electrocuting machines. Utilization of the device A permits as many as 10,000 poultry to be stunned per hour. It is also noteworthy that the apparatus A is readily adjustable with relation to the speed of the conveyor 17 so that contact of requisite duration will always be provided the poultry, regardless of the rate at which they are being conveyed.

Although herein eight groups of electrode members 13 have been shown, it is apparent that any number may be utilized with equal facility. It is implicit in the structure of the device A that adjustment of the resistors 23 will control the current in each of the circuits 21 so that the amperage therein may be raised or lowered with relation to the above set forth 100 milliamperes norm, dependent upon differentials in bodily resistance to current, as may be found in certain flocks of chickens, and for other like reasons requiring a departure from the norm. Therefore, the control circuits 21 are of dual purpose in that the number in circuit-open condition may be varied inversely as the speed of the conveyor 17, and the currents flowing therethrough may be regulated to supply the necessary shock to the fowls under the operation conditions obtaining.

Operators are protected from inadvertent electric shock by means of the insulated guide plates 15, 15', and the insulator bar 11 which prevent short circuiting through the guard plates 9, 9', and the base plate 7.

It should be understood that changes and modifications in the form, construction, arrangement, and combination of the several parts of the apparatus for stunning poultry may be made and substituted for those herein shown and described without departing from the nature and principle of the present invention.

Having thus described my invention what I claim and desire to secure by Letters Patent is:

1. Apparatus for stunning poultry comprising a base section, spaced upstanding wall-like members associated with said base section for defining a pathway therebetween, an insulator bar suitably mounted on said base section, a plurality of spaced parallel conductor bars mounted at one of their ends in said insulator bar, a brush-like group of vertically extending resilient electrode-forming members mounted on each of said bars, a controllable circuit connected to each of said conductor bars for causing a current to flow through the electrode members, a separate current limiting member in series circuit with each of said electrodes, and a source of electricity connected to said circuits.

2. Apparatus for stunning poultry comprising a base section, spaced upstanding wall-like members associated with said base section for defining a pathway therebetween, an insulator bar suitably mounted on said base section, a plurality of spaced parallel conductor bars mounted at one of their ends in said insulator bar, a brush-like group of vertically extending resilient electrode-forming members mounted on each of said bars, an individual circuit connected to each of said conductor bars, said circuits comprising a current-control member for regulating the current flowing through the electrodes, and a switch for optionally permitting current to flow through said electrodes, and a source of electricity connected to said circuits.

3. Apparatus for stunning poultry comprising a base section, spaced upstanding wall-like members associated with said base section for defining a pathway therebetween, an insulator bar suitably mounted on said base section, a plurality of spaced parallel conductor bars mounted at one of their ends in said insulator bar, a plurality of resilient upwardly projecting electrode-forming members mounted in side-by-side relationship upon each of the conductor bars, the lower portions of said electrode-forming members being coiled spacedly about the conductor bars, a controllable circuit connected to each of said conductor bars for causing a current to flow through the electrode members, a separate current limiting member in series circuit with each of said electrodes, and a source of electricity connected to said circuits.

4. For use with a moving conveyor system, a stationary electric poultry stunning device comprising a plurality of stunning circuits connected in parallel, current limiting means in each stunning circuit, transformer means associated with said device for supplying electric current to said stunning circuits, an electrode group for each stunning circuit, each said group comprising a mounting conductor bar and a plurality of resilient wires conductively secured thereto at spaced intervals and extending parallelly therefrom into the path of the fowls being conveyed, a frame supporting said conductor bars transversely to the direction of conveyor movement and in spaced sequence along the path of the conveyor, means operatively connected with said electrode groups for selectively deenergizing said electrode groups, and means associated with each said circuit to ground the current passing through the fowls being conveyed.

5. Apparatus for stunning poultry, comprising a supporting frame, a plurality of spaced parallel conductor bars mounted on said supporting frame, a brush-like group of vertically extending resilient electrode-forming members mounted on each of said bars, a controllable circuit connected to each of said conductor bars for causing a current to flow through the electrode-forming members, a separate current-limiting member in series circuit with each of said electrodes, and a source of electricity connected to said circuits.

6. Apparatus for stunning poultry comprising a supporting frame, a plurality of spaced parallel conductor bars mounted on said mounting frame, a brush-like group of vertically extending resilient electrode-forming members mounted on each of said bars, an individual circuit connected to each of said conductor bars, said circuits having in each a current-control member for regulating the current flowing through the electrode and a switch for optionally permitting current to flow through said electrode, and a source of electricity connected to said circuits.

7. Apparatus for stunning poultry comprising a supporting frame, a plurality of spaced parallel conductor bars mounted on said supporting frame, a plurality of resilient upward projecting electrode-forming members mounted in side-by-side relationship upon each of the conductor bars, the lower portions of said electrode-forming members being coiled about the conductor bars, a controllable circuit connected to each of said conductor bars for causing a current to flow through the electrode members, a separate current limiting member in series circuit with each of said electrodes, and a source of electricity connected to said circuits.

8. In poultry stunning apparatus, a plurality of electrode members arranged in alignment, said electrode members being connected by separate resistors into one side of an electrical circuit, a plurality of poultry-supporting shackles arranged in alignment substantially parallel to said electrode members, an electrical conductor connected into the opposite side of said circuit, means operatively associated with said shackles for making continued contact between said conductor and said supporting shackles, and means associated with said shackles for moving them spacedly over the said aligned electrode members, whereby fowls suspended from said shackles will contact said electrode members successively.

9. In poultry stunning apparatus, a plurality of yieldable brushlike electrode members arranged in alignment, said electrode members being connected by separate resistors into one side of an electrical circuit, a plurality of poultry-supporting shackles, the said shackles being electrically conductive and making continued contact with the opposite side of said circuit, and means associated with said shackles for moving them spacedly over the said aligned electrode members, whereby fowls suspended from said shackles will contact said electrode members successively.

10. Poultry stunning apparatus as defined in claim 8, in which the circuit is such as will supply each electrode with substantially 100 milliamperes at a voltage of approximately 600 volts.

11. Poultry stunning apparatus as defined in claim 9 in which the circuit is such as will supply each electrode with substantially 100 milliamperes at a voltage of approximately 600 volts.

GILBERT C. COSDEN.

REFERENCES CITED

The following references are of record in the file of this patent:

UNITED STATES PATENTS

| Number | Name | Date |
|---|---|---|
| 2,109,678 | Nelson | Mar. 1, 1938 |
| 2,184,868 | Williams | Dec. 26, 1939 |
| 2,335,993 | Bland et al. | Dec. 7, 1943 |